United States Patent
Bloebaum et al.

(10) Patent No.: US 7,680,490 B2
(45) Date of Patent: Mar. 16, 2010

(54) SYSTEM AND METHOD FOR MULTIMEDIA NETWORKING WITH MOBILE TELEPHONE AND HEADSET

(75) Inventors: L. Scott Bloebaum, Cary, NC (US); Erwin Weinans, Klijndijk (NL)

(73) Assignee: Sony Ericsson Mobile Communications AB, Lund (SE)

( * ) Notice: Subject to any disclaimer, the term of this patent is extended or adjusted under 35 U.S.C. 154(b) by 643 days.

(21) Appl. No.: 11/537,166

(22) Filed: Sep. 29, 2006

(65) Prior Publication Data

US 2008/0004052 A1  Jan. 3, 2008

Related U.S. Application Data (60) Provisional application No. 60/806,328, filed on Jun. 30, 2006.

(51) Int. Cl.
*H04M 3/42* (2006.01)
*H04W 4/00* (2009.01)
*H04M 1/00* (2006.01)

(52) U.S. Cl. ............... 455/414.1; 455/466; 455/575.2

(58) Field of Classification Search .............. 455/414.1
See application file for complete search history.

(56) References Cited

U.S. PATENT DOCUMENTS

| | | |
|---|---|---|
| 2002/0111140 A1 | 8/2002 | Kim |
| 2002/0160820 A1 | 10/2002 | Winkler |
| 2003/0045235 A1 | 3/2003 | Mooney et al. |
| 2004/0107271 A1 | 6/2004 | Ahn et al. |
| 2004/0132500 A1 | 7/2004 | Rogalski et al. |
| 2004/0266349 A1 | 12/2004 | Wang |
| 2005/0064915 A1 | 3/2005 | Lair |
| 2005/0135297 A1 | 6/2005 | Katayama |
| 2005/0201360 A1 * | 9/2005 | Redstone ............ 370/352 |
| 2005/0202857 A1 | 9/2005 | Seshadri et al. |
| 2005/0239445 A1 | 10/2005 | Karaoguz et al. |
| 2005/0282589 A1 | 12/2005 | Barneah |

(Continued)

FOREIGN PATENT DOCUMENTS

EP  1 469 659  10/2004

(Continued)

OTHER PUBLICATIONS

Ohta et al., "Adaptive Terminal Middleware for Session Mobility", Multimedia Signal Processing, 2002 IEEE Workshop, 2002, IEEE May 19, 2003, pp. 394-398.

(Continued)

Primary Examiner—Lester Kincaid
Assistant Examiner—Yu (Andy) Gu
(74) Attorney, Agent, or Firm—Renner, Otto, Boisselle & Sklar, LLP (57) ABSTRACT

Disclosed is a method for transmitting multimedia content stored on a network to a mobile telephone and/or other rendering device (e.g., a mobile telephone accessory). In one embodiment, a mobile telephone and a mobile telephone accessory (e.g., a headset) are communicatively coupled to a network. The mobile telephone requests information from a device associated with the network. The mobile telephone selects information from a content server to be rendered and a rendering device. The mobile telephone configures the rendering device to receive the information from the network through a network adapter. The mobile telephone maintains control of the session and the rendering device through a second interface (e.g., Bluetooth).

19 Claims, 5 Drawing Sheets

U.S. PATENT DOCUMENTS

| | | | |
|---|---|---|---|
| 2006/0002324 A1* | 1/2006 | Babbar et al. | 370/325 |
| 2006/0025074 A1 | 2/2006 | Liang et al. | |
| 2006/0046656 A1 | 3/2006 | Yang | |
| 2006/0065709 A1* | 3/2006 | Yamashita | 235/375 |
| 2006/0146746 A1 | 7/2006 | Kim | |
| 2006/0166716 A1* | 7/2006 | Seshadri et al. | 455/575.2 |
| 2006/0194600 A1 | 8/2006 | Palin et al. | |
| 2007/0165875 A1* | 7/2007 | Rezvani et al. | 381/74 |
| 2007/0291723 A1 | 12/2007 | Chou et al. | |

FOREIGN PATENT DOCUMENTS

| | | |
|---|---|---|
| EP | 1 585 291 A1 | 10/2005 |
| WO | 03/056790 A1 | 7/2003 |

OTHER PUBLICATIONS

International Search Report for International Application No. PCT/US2006/049444 dated Jun. 15, 2007.

International Preliminary Report on Patentability for corresponding International Application No. PCT/US2006/049444 dated Oct. 6, 2008.

* cited by examiner

SYSTEM AND METHOD FOR MULTIMEDIA NETWORKING WITH MOBILE TELEPHONE AND HEADSET

RELATED APPLICATION DATA

This application claims the benefit of U.S. Provisional Application No. 60/806,328, filed Jun. 30, 2006, which is incorporated by reference as if fully rewritten herein.

TECHNICAL FIELD OF THE INVENTION

The present invention relates to a system and method for rendering multimedia content between a multimedia storage source and a mobile telephone and/or a mobile telephone accessory (e.g., a headset).

DESCRIPTION OF THE RELATED ART

Mobile telephones have evolved from voice-only electronic devices to multi-functional electronic devices. For example, mobile telephones may now function as electronic organizers, digital cameras, audio applications (e.g., MP3 players), video applications (e.g., video players), video game terminals, etc. Moreover, mobile telephones are not only used for voice communications, but they also are used in a variety of other forms (e.g., in instant messaging applications, sharing photographs, gaining access to information on the Internet, etc).

As the mobile telephone has evolved, so too have accessories for mobile telephones. For example, the first mobile telephones required the user to hold the telephone next to the user's mouth and ear during use. Later, a wired ear bud and microphone were developed that connected to the mobile telephone were developed. The wired ear bud allows the user's hands to be free from holding the mobile telephone during use. Wireless headsets have also been developed that provide the user with both wireless and hands-free convenience.

A wireless interface commonly used in headsets and mobile telephones is referred to as "Bluetooth" technology. Bluetooth refers to a technical specification designed to standardize wireless transmission between a wide variety of electronic devices, such as personal computers, cordless telephones, headsets, printers, personal digital assistants ("PDAs"), etc. Bluetooth acts as a "virtual cable", whereby one electronic device can easily communicate with another electronic device.

Bluetooth operates using frequency-hopping spread spectrum, where data packets are spread across the 2.45-GHz Spectrum at a rate of 1,600 hops per second to lessen interference. For Bluetooth devices, the nominal link range is 10 meters and the gross data rate is up to 3 Mbps, although higher data rates have been proposed for future versions of the standard. Bluetooth can support both synchronous connection oriented ("SCO") links for voice and asynchronous connectionless ("ACL") links for packet data.

Wireless local area networks ("WLANs") are now ubiquitous in everyday life. Such WLAN's are commonly available in many public areas (so-called "hotspots" or "hotzones"), as well as in homes and office environments. WLANs are generally compliant with one or more IEEE standards (e.g., 802.11a, 802.11b, 802.11g, etc.) and are easily configured to provide for open access or to limit access by authorization and link-level security procedures.

End users generally access the WLAN through WLAN adapters that may be implemented as a removable or fully embedded component in a stationary, portable or fully mobile device. Examples of such implementation in a desktop computer includes ISA or PCI cards, as well as an external or removable USB adapter. Typical implementations for laptop computers include removable PCMCIA cards or embedded PCI Express or USB adapters, while typical implementations for PDAs and cellular phones include removable SD Cards or embedded with USB or SDIO interconnections. In addition, the physical WLAN adapter is typically augmented with software (a "driver") that allows the device's operating system to manage the adapter and to create a transparent connection to the wireless network that can be used by various applications to the benefit of the end user.

Conventional methods for facilitating communication between mobile telephones and mobile telephone equipment (e.g., headsets, hands-free kits, etc.) are generally capable of receiving signals received directly from the mobile telephone. Such direct communication limits the functionality of the mobile telephone, ability of the user to use the mobile telephone for more than one task, and limits the battery life of the mobile telephone.

SUMMARY

Often times, it is desirable for users of mobile telephones to utilize the full functionality of their mobile telephone accessories, as well as gain access to information stored on a wireless local area network, a wide area network, or personal-area access technology (e.g., wireless local area network, cellular network, WiMax, ultra wideband network, etc.). Thus, a strong need exists for a system and method for rendering information remotely stored on such networks by a mobile telephone and/or mobile telephone accessory.

One aspect of the present invention relates to a method for rendering multimedia content stored on a network, the method including: obtaining a first unique address for a mobile telephone in a wireless local area network, wherein the local area network includes one or more associated devices; obtaining a second unique address for a rendering device in the network, wherein the rendering device is communicatively coupled to the network through a first interface and the rendering device is also communicatively coupled to the mobile telephone through a second interface; requesting information from at least one of the associated devices on the network through the mobile telephone; receiving information responsive to the request for information by the mobile telephone; selecting information to be rendered; selecting the rendering device to render the selected information; and rendering the selected information on the selected rendering device.

According to an aspect of the invention, at least one of the first unique address or the second unique address is an Internet Protocol address.

According to an aspect of the invention, the information includes an identification of services and/or devices available on the network. According to an aspect of the invention, the identification of services includes multimedia content stored on a content server.

According to an aspect of the invention, the multimedia content includes at least one audible component.

According to an aspect of the invention, the multimedia content also includes a video component for display on the mobile telephone.

According to an aspect of the invention, the rendering device is communicatively coupled to the network through a wireless communication protocol.

According to an aspect of the invention, control signals are transmitted directly from the mobile telephone to the rendering device through a second wireless communication protocol.

According to an aspect of the invention, the control signals include a configuration from the rendering device based at least in part on the selected information to be rendered.

According to an aspect of the invention, the second wireless communication protocol is a Bluetooth compatible protocol.

According to an aspect of the invention, the rendering device requests one or more associated devices on the network to initiate a session using a universal resource locator link.

According to an aspect of the invention, at least one of the mobile telephone and/or the rendering device is authenticated by one or more devices on the network prior to receiving information responsive to the request for information.

According to an aspect of the invention, the rendering device is a headset.

One aspect of the present invention relates to a method for rendering multimedia content stored on a network, the method comprising: determining presence of a network by a mobile telephone having a network adapter, wherein the network includes one or more associated devices; and configuring a rendering device to operate in a first communication mode when a network is present and configuring the rendering device to operate in a second communication mode when a network is not detected.

According to an aspect of the invention, the rendering device is configured to render multimedia content provided directly from an access point associated with the network in the first communication mode.

According to an aspect of the invention, the multimedia content is provided to the rendering device through a wireless adapter.

According to an aspect of the invention, the wireless adapter communicates with the network through an 802.11-compatible protocol.

According to an aspect of the invention, the rendering device is configured to render the multimedia content provided from the mobile telephone in the second communication mode.

According to an aspect of the invention, the multimedia content is provided to the rendering device through a second wireless adapter.

According to an aspect of the invention, the wireless adapter is a Bluetooth adapter.

According to an aspect of the invention, the rendering device is configured in the first and second communication mode by the mobile telephone prior rendering an associated multimedia content.

One aspect of the present invention relates to a method for rendering multimedia content stored on a network, the method comprising: obtaining a unique address for a rendering device in the network, wherein the rendering device is communicatively coupled to the network through a first interface and the rendering device is also communicatively coupled to a mobile telephone through a second interface; requesting information from at least one of the associated devices on the network through the mobile telephone; receiving information responsive to the request for information by the mobile telephone; and rendering information received directly from the network on the rendering device.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

The term "electronic equipment" includes portable radio communication equipment. The term "portable radio communication equipment", which herein after is referred to as a mobile radio terminal includes all equipment such as mobile telephones, pagers, communicators, i.e., electronic organizers, personal digital assistants (PDA's), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The present invention is directed to a system and method for transmitting network-based content from a network to a mobile telephone and/or a rendering device (e.g., mobile telephone accessory). The invention is described primarily in the context of a mobile telephone. However, it will be appreciated that the invention is not intended to relate solely to a mobile telephone and can relate to any type of electronic equipment. Other types of electronic equipment that may benefit from aspects of the present invention include playback devices having at least audio playback capability or video playback capability in addition to audio playback capability. Exemplary playback devices include MP3 players, CD players and DVD players.

Figure 1:
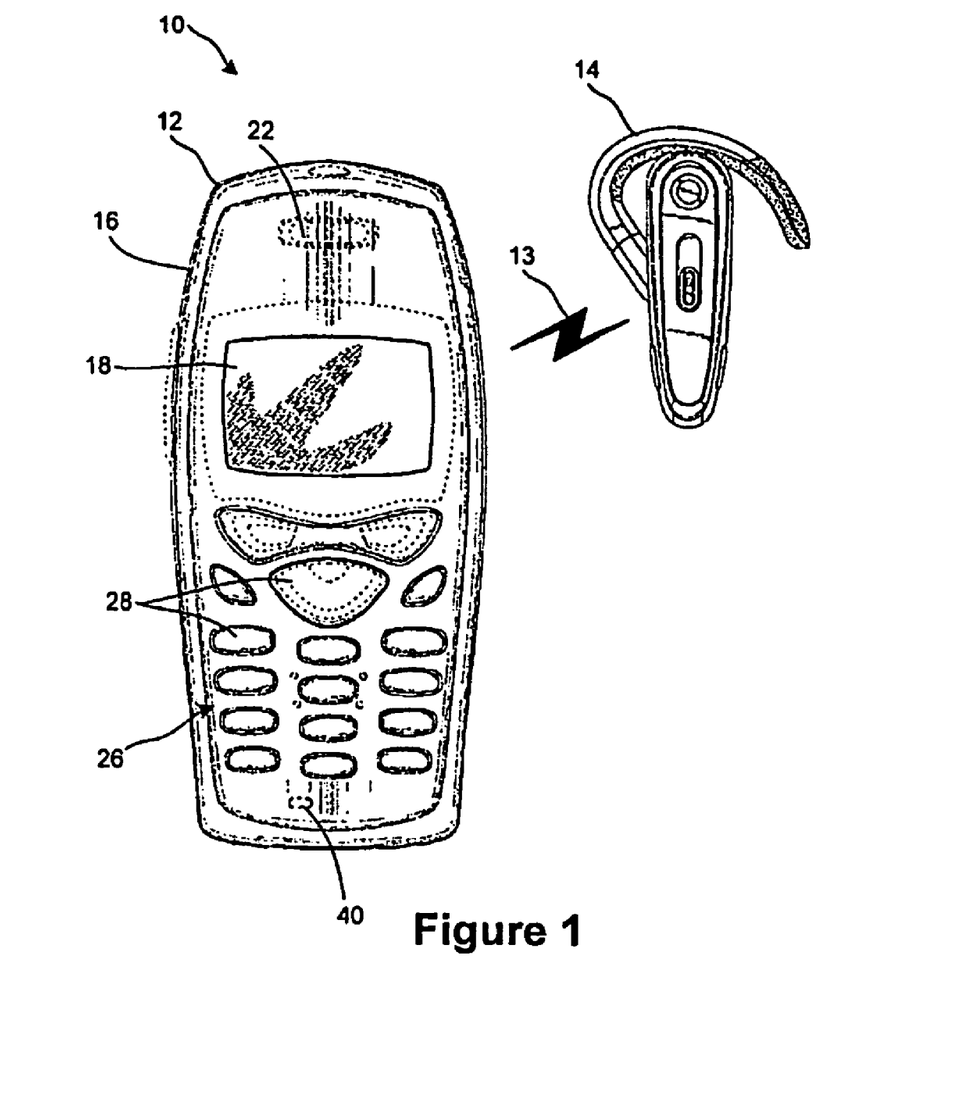
FIG. 1 is an exemplary block diagram of a mobile telephone and rendering device in accordance with aspects of the present invention.

Referring to FIG. 1, an electronic equipment assembly 10 is shown in accordance with the present invention. The illustrated electronic equipment assembly 10 includes electronic equipment 12 and a wirelessly coupled electronic equipment accessory 14. The electronic equipment 12 in the exemplary embodiment is a mobile telephone and will be referred to as the mobile telephone 12. The mobile telephone 12 is shown as having a "brick" or "block" design type housing 16, but it will be appreciated that other type housings, such as a clamshell housing or a slide-type housing, may be utilized without departing from the scope of the invention.

The electronic equipment accessory 14 in the exemplary embodiment is a rendering device in the form of a headset and will be referred to as the headset 14. The headset 14 is shown as an ear mountable speaker and microphone assembly that exchanges audio data with the mobile telephone 12 over a wireless link. One of ordinary skill in the art will appreciate that any rendering device operable to receive signals discussed herein is deemed to fall within the scope of the present invention. For example, suitable rendering devices include headphones, earphones, speakers, televisions, stereos, and the like.

For purposes of the description herein, the wireless link between the mobile telephone 12 and the headset 14 is established using a Bluetooth protocol, such as in accordance with the Specification of the Bluetooth System, Covered Core Package version 2.0+EDR, dated Nov. 4, 2004, which is incorporated herein by reference in its entirety. Other suitable wireless interfaces (e.g., radio frequency, 802.11 compatible protocols, infrared, etc.) also may be used to transmit data to the mobile telephone 12 and/or to the headset 14.

The mobile telephone 12 includes a display 18. The display 18 displays information to a user such as operating state, time, telephone numbers, contact information, various navigational menus, etc., which enables the user to utilize the various feature of the mobile telephone 12. The display 18 may also be used to visually display content accessible by the mobile telephone 12 and/or headset 14 from one or more remote sources (e.g., a media server, a network, etc.). The displayed content may include audio and/or video presentations stored locally in memory 20 (FIG. 2) of the mobile telephone 12 and/or stored remotely from the mobile telephone 12 (e.g., on a remote storage device, a media server, remote personal computer, etc.). Such presentations may be derived, for example, from multimedia files, including audio and/or video files, from a received mobile radio and/or television signal, etc. In many situations, the video presentations are accompanied by audio presentations. For example, the displayed video component may be a "music video" and the corresponding audio component may be music intended to be synchronized with the video component. As another example, the displayed video component may correspond to a received mobile television signal and the corresponding audio component may be speech and/or music intended to be synchronized with the video component.

The audio component may be broadcast to the user with a speaker 22 of the mobile telephone 12. Alternatively, the audio component may be broadcast to the user with a speaker 24 (FIG. 2) of the headset 14. For stereo listening, the headset 14 may include a pair of speakers 24. Delivery of audio data from the content source to the mobile telephone 12 and/or the headset 14 will be described in greater detail below.

The mobile telephone 12 further includes a keypad 26 that provides for a variety of user input operations. For example, the keypad 26 may include alphanumeric keys 28 for allowing entry of alphanumeric information such as telephone numbers, phone lists, contact information, notes, etc. In addition, the keypad 26 typically may include special function keys such as a "call send" key for initiating or answering a call, and a "call end" key for ending, or "hanging up" a call. Special function keys may also include menu navigation keys, for example, for navigating through a menu displayed on the display 18 to select different telephone functions, profiles, settings, etc., as is conventional. Other keys associated with the mobile telephone 12 may include a volume key, audio mute key, an on/off power key, a web browser launch key, a camera key, etc. Keys or key-like functionality may also be embodied as a touch screen associated with the display 18.

The mobile telephone 12 includes conventional call circuitry that enables the mobile telephone 12 to establish a call and/or exchange signals with a called/calling device, typically another mobile telephone or landline telephone. However, the called/calling device need not be another telephone, but may be some other device such as an Internet web server, content providing server, etc.

Figure 2:
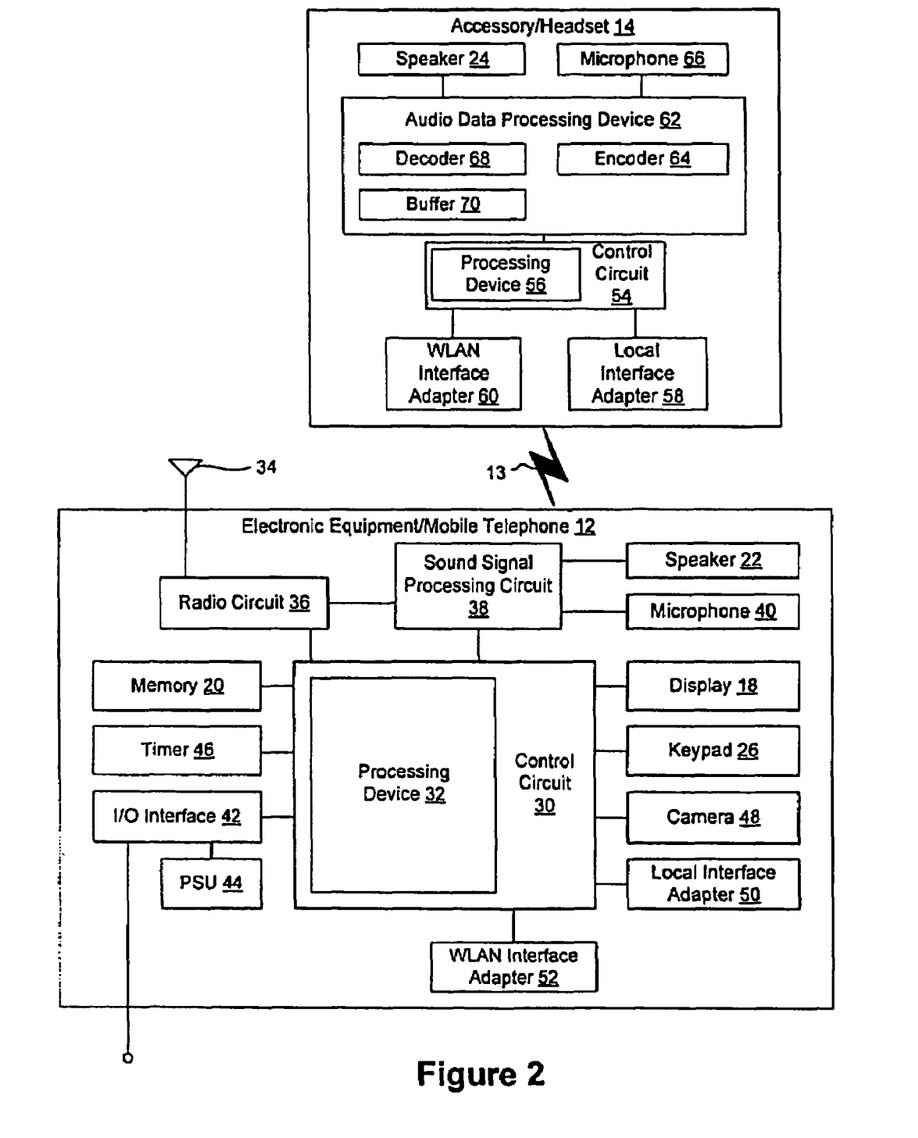
FIG. 2 is an exemplary schematic diagram of a mobile telephone and rendering device in accordance with aspects of the present invention.

Referring to FIG. 2, a functional block diagram of the electronic equipment assembly 10 is illustrated. The mobile telephone 12 includes a primary control circuit 30 that is configured to carry out overall control of the functions and operations of the mobile telephone 12. The control circuit 30 may include a processing device 32, such as a CPU, microcontroller or microprocessor. The processing device 32 executes code stored in a memory (not shown) within the control circuit 30 and/or in a separate memory, such as memory 20, in order to carry out conventional operation of the mobile telephone 12. The memory 20 may be, for example, a buffer, a flash memory, a hard drive, a removable media, a volatile memory and/or a non-volatile memory. In addition, the processing device 32 executes code to carry out various functions of the mobile telephone 12.

Continuing to refer to FIGS. 1 and 2, the mobile telephone 12 includes an antenna 34 coupled to a radio circuit 36. The radio circuit 36 includes a radio frequency transmitter and receiver for transmitting and receiving signals via the antenna 34 as is conventional. The mobile telephone 12 further includes a sound signal processing circuit 38 for processing the audio signal transmitted by/received from the radio circuit 36. Coupled to the sound processing circuit 38 are the speaker 22 and a microphone 40 that enable a user to listen and speak via the mobile telephone 12 as is conventional. The radio circuit 36 and sound processing circuit 38 are each coupled to the control circuit 30 so as to carry out overall operation.

The mobile telephone 12 also includes the aforementioned display 18 and keypad 26 coupled to the control circuit 30. The mobile telephone 12 further includes an I/O interface 42. The I/O interface 42 may be in the form of typical mobile telephone I/O interfaces, such as a multi-element connector at the base of the mobile telephone 12. As is typical, the I/O interface 42 may be used to couple the mobile telephone 12 to a battery charger to charge a power supply unit (PSU) 44 within the mobile telephone 12. In addition, or in the alternative, the I/O interface 42 may serve to connect the mobile telephone 12 to a wired personal hands-free adaptor, to a personal computer or other device via a data cable, etc. The mobile telephone 12 may also include a timer 46 for carrying out timing functions. Such functions may include timing the durations of calls, generating the content of time and date stamps, etc.

The mobile telephone 12 may include various built-in accessories, such as a camera 48 for taking digital pictures. Image files corresponding to the pictures may be stored in the memory 20. In one embodiment, the mobile telephone 12 also may include a position data receiver (not shown), such as a global positioning satellite (GPS) receiver, Galileo satellite system receiver or the like.

To establish wireless communication with other locally positioned devices, such as the headset 14, another mobile telephone, a computer, etc., the mobile telephone 12 may include a local wireless interface adapter 50, such as a Bluetooth adaptor.

To establish communications with network-based content, the mobile telephone 12 may further include a wireless local area network interface adapter 52. Preferably, the WLAN adapter 52 is compatible with one or more IEEE 802.11 protocols (e.g., 802.11(a), 802.11(b) and/or 802.11(g), etc.) and allows the mobile telephone 12 to acquire a unique identifier (e.g., MAC and IP addresses) on an associated network and communicate with one or more devices on the network, assuming the user has the appropriate privileges and/or has been properly authenticated.

The mobile telephone 12 may be configured to operate in a wide area communications system (not illustrated). The system can include one or more servers or call control elements for managing calls placed by and destined to the mobile telephone 12, transmitting network-based content (e.g., image files, audio files, video files, etc.) to the mobile telephone 12 and carrying out any other support functions. The server may communicate with the mobile telephone 12 via a network and a transmission medium. The transmission medium may be any appropriate device or assembly, including, for example, a communications tower, another mobile telephone, a wireless access point, a router, a satellite, etc. Portions of the network may include wired and/or wireless transmission pathways.

The headset 14 includes a primary control circuit 54 that is configured to carry out overall control of the functions and operations of the headset 14. The control circuit 54 may include a processing device 56, such as a CPU, microcontroller or microprocessor. The processing device 56 executes code stored in a memory (not shown) within the control circuit 54 and/or in a separate memory, such as memory (not shown), in order to carry out operation of the headset 14, as described herein. The memory may be, for example, a buffer, a flash memory, a hard drive, a removable media, a volatile memory and/or a non-volatile memory. In addition, the processing device 56 executes code to carry out various functions of the headset 14.

The headset 14 includes a local interface adapter 58 that may be compatible with the local interface adapter 50 of the mobile telephone 12 to establish a wireless interface between the headset 14 and the mobile telephone 12. The local interface adapter 58 is coupled to the control circuit 54 to selectively control and process information and/or data received and/or transmitted by the local interface adapter 58. Preferably, as discussed above, the local interface adapter 58 is Bluetooth compatible. The wireless interface established between adapters 50 and 58 may be used to exchange data, such as audio data, commands, control and/or status information between the mobile telephone 12 and the headset 14. One of ordinary skill in the art will understand the basic operations of a Bluetooth wireless communication interface, so the details will not be described here in detail for the sake of brevity.

The headset 14 further includes a wireless local area network (WLAN) interface adapter 60. The WLAN interface adapter 60 is coupled to the control circuit 54 to selectively control and process information and/or data received and/or transmitted by the WLAN interface adapter 60. Preferably, the WLAN adapter 60 is compatible with one or more IEEE 802.11 protocols (e.g., 802.11(a), 802.11(b) and/or 802.11 (g), etc.) and allows headset 14 to acquire a unique address (e.g., IP address) on an associated network and communicate with one or more devices associated with the network, assuming the user has the appropriate privileges and/or has been properly authenticated.

The headset 14 further includes an audio data processing device 62 that manages audio data. For example, the audio data processing device 62 may include an encoder 64 that encodes an audio signal received from a microphone 66 coupled to the headset 14. Encoded audio data may be transmitted to the mobile telephone 12 for use as part of a telephone call.

In addition, the audio data processing device 62 may include a decoder 68 and a data buffer 70 to process audio data received from the mobile telephone 12 and/or one or more devices associated with a network.

The received audio data may be incoming audio data associated with a telephone call. In other situations, the audio data received by the headset 14 may be audio (e.g., music, sound, voice, etc.) derived from an audio file played back by the mobile telephone 12. The audio data received by the headset 14 may also be network-based content, which originated from one or more devices associated with a network. The network-based content may be transmitted and/or streamed directly to the headset 14 for listening by the user, as described below. In yet other situations, the audio data may be associated with video content displayed on the display 18 of the mobile telephone 12. For example, a video file containing an audio component stored in the memory 20 and/or stored remotely on a network (e.g., network-based content) may be rendered by the mobile telephone 12.

In such situations, the video component of the video file or received video signal may be decoded by, for example, the control circuit 30 or dedicated video decoder (not shown) to generate a video signal output to the display 18 for viewing. The audio component of the video file or received video signal may be decoded and delivered as an audio signal to the speaker 22 and/or the audio component may be transmitted as audio data to the headset 14 for decoding into an audio signal that is broadcast by the speaker 24. In another embodiment, the audio component of the video file or received video signal may be transmitted as audio data directly to the headset 14 from one or more devices associated with a network, without transmission to the mobile telephone 12, for decoding into an audio signal that is broadcast by the speaker 24.

As explained in detail below, audio data transmitted from the mobile telephone 12 to the headset 14 and/or transmitted from one or more devices associated with a network to the headset 14 is typically in the form of media packets. Each media packet may contain a quantity of audio data, such as about 5 milliseconds of audio data. The audio data may be buffered by the buffer 62 and decoded by the decoder 60 into an audio signal for delivery to the speaker 24. As will be appreciated, the audio data may be mono, stereo or surround-sound, or arranged in any other suitable audio format.

Figure 3:
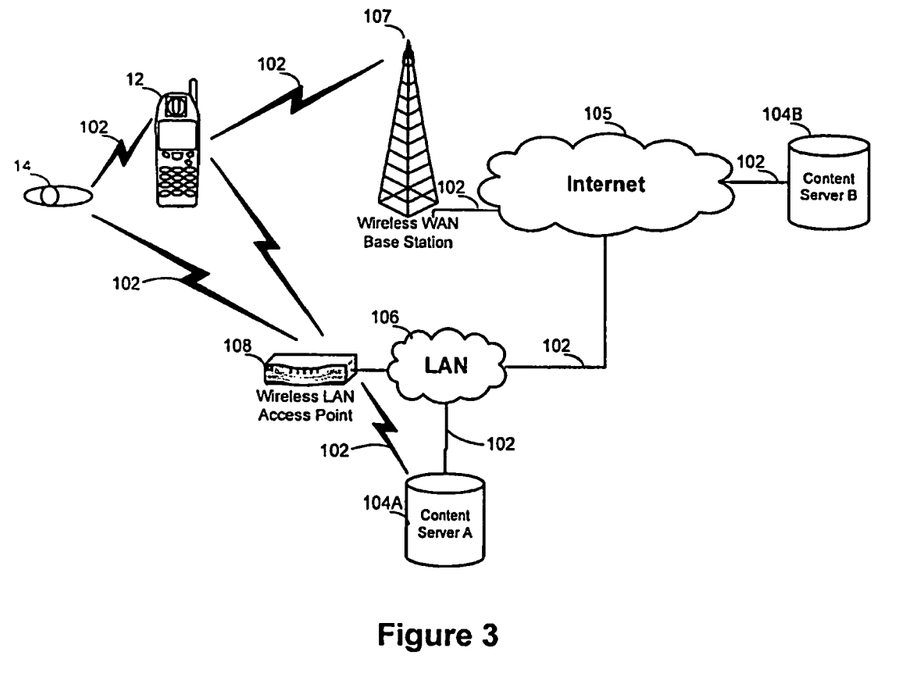
FIG. 3 is an exemplary block diagram of wireless network in accordance with aspects of the present invention.

An exemplary network 100 in accordance with the present invention is illustrated in FIG. 3. The network 100 may include one or more communication media 102, one or more content servers 104 (e.g., 104A, 104B), wide area network (WAN) 105 (e.g., Internet), a local area network (LAN) 106, at least one wireless LAN access point (AP) 108, a WAN base station 107, a mobile telephone 12 and a headset 14. Although the content server 104A is shown as being outside of the LAN 106, this is for illustrative purposes only. One of ordinary skill in the art will readily appreciate that the content server 104A may be located within the LAN 106 depending on the specific network topology. One of ordinary skill in the art will also appreciate that the exemplary LAN 106 may be a wireless local area network, a wide area network, personal-area access technology (e.g., wireless local area network, cellular network, WiMax, ultra wideband network, etc.) and/or a public network (e.g., the Internet).

The communication medium 12 can take the form of any medium that permits electronic devices to exchange information or data. For instance, the communication media 12 may be a wired communications medium, such as Ethernet or a wireless communications medium, such as IEEE 802.11(a), 802.11 (b) or 802.11(g). In addition, the communication media 12 may also be a combination of wired and wireless communications mediums, as illustrated in FIG. 3. One of ordinary skill in the art will readily appreciate that any communications medium allowing the functionality described herein shall be deemed to be within the scope of the present invention. Preferably the communications medium 12 can support a variety of network protocols including, for example, TCP/IP, UPnP, and the like.

As shown in FIG. 3, the mobile telephone 12 may receive network-based content from content server 104A from the access point 108. In addition, the mobile telephone may receive network-based content from content server B through the base station 107 and/or the access point 108. The head set 14 also may receive network-based content from content server 104A from the access point 108. In addition the head set 14 may receive network-based content from content server 104B from the access point 108 through the Internet 105 and local area network 106.

Figure 4:
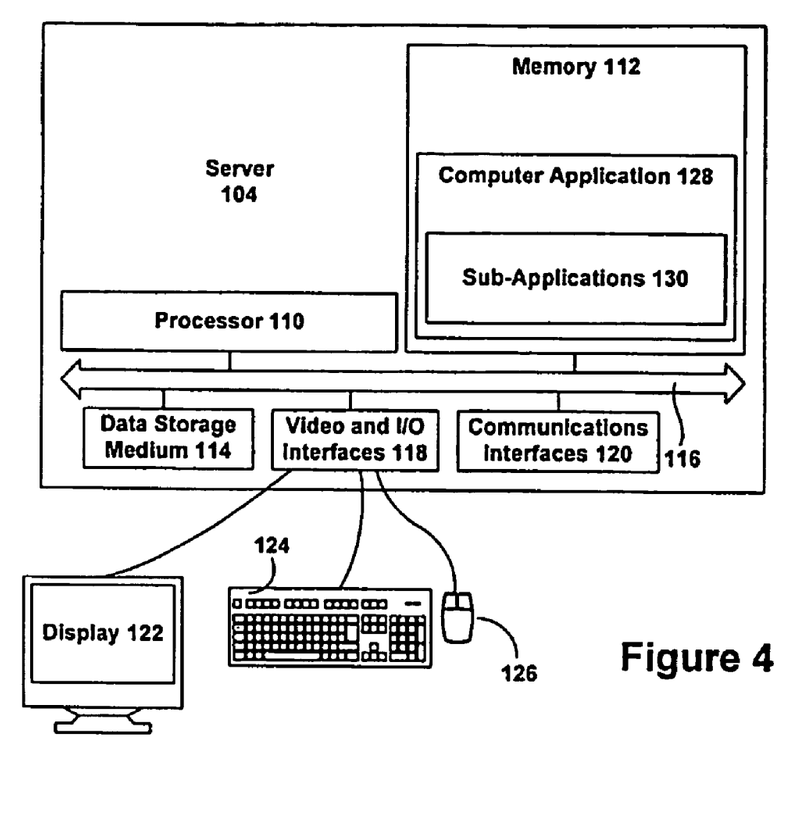
FIG. 4 is an exemplary schematic diagram of a server in accordance with aspects of the present invention.

FIG. 4 illustrates a schematic block diagram of an exemplary content server 104 (e.g., content server A, content server B, etc.). The content server 104 may be any type of server. Preferably, the content server 104 is a media server that is compatible with protocols developed by the Internet Engineering Task Force (IETF) including IP, TCP, UDP, RTP, HTTP and the like. The content server 104 generally includes a processor 110, a memory 112, a data storage medium 114, a local interface 116, video and input/output interfaces 118, and various communication interfaces 120. The content server 104 may include optionally a display 122, a keyboard 124, and a user input device 126 (e.g., a computer mouse).

The content server 104 is capable of executing one or more computer applications 128 in accordance with aspects of the present invention. In one embodiment, computer applications 128 include at least one audio and/or video player that is capable of transmitting multimedia content (e.g., audio files, video files, photographs, etc.) in a user-sensible format upon request from an associated user. The multimedia content may be stored in the data storage medium 114 or a remote storage medium (not shown) that is communicatively coupled to the content server 104.

As stated above, the network-base content (also referred to herein as multimedia content) may take any form (e.g., audio, video, photographs, and the like) and may be stored in any suitable format (e.g., MPEG, AVI, MP3, JPG, TIFF, and the like). The content server 104 may also store communications software, which is capable of converting the multimedia content stored on the content server 104 and/or the remote storage medium to a format that can be rendered locally and/or remotely by the requesting device and/or a peripheral device associated with the requesting device (e.g., headset 14). Alternatively, the content server 104 may provide the multimedia content in a known format and allow the requesting device and/or a peripheral device associated with the requesting device to perform any necessary conversion.

The computer application 128 may be logically associated with or call one or more additional computer applications or one or more sub-computer applications 130, which generally include compilations of executable code. In one embodiment, the computer application 128, and/or the sub-applications 130 are embodied as one or more computer programs (e.g., one or more software applications including compilations of executable code). The computer program(s) can be stored on a data storage medium or other computer readable medium, such as a magnetic or optical storage device (e.g., hard disk, CD-ROM, DVD-ROM, etc.).

To execute the computer application 128 and associated sub-applications 130, the content server 104 can include one or more processors 110 used to execute instructions that carry out a specified logic routine(s). Preferably, the content server 104 is based on a client-server architecture and may serve multiple clients. However, one of ordinary skill in the art will readily appreciate that any combination of computers having the functionality described herein shall be deemed to be within the scope of the present invention. Preferably, the content server 104 is a media server that is compatible with one or more protocols developed by the Internet Engineering Task Force (IETF) including IP, TCP, UDP, RTP, HTTP and the like.

The content server 104 may have a memory 112 for storing data, software, logic routine instructions, computer programs, files, operating system instructions, multimedia content and the like. As illustrated in FIG. 4, the computer application 128 and sub-applications 130 can be stored in the memory 112. The memory 112 can comprise several devices and includes, for example, volatile and non-volatile memory components.

Accordingly, the memory 112 can include, for example, random access memory (RAM), read only memory (ROM), hard disks, floppy disks, compact disks (e.g., CD ROM, DVD ROM, CD RW, etc.), tapes, and/or other memory components, plus associated drives and players for these memory types. The processor 110, memory 112, and the data storage medium 114 are coupled using a local interface 116. The local interface 116 can be, for example, a data bus with accompanying control bus, a network, or other subsystem.

The content server 104 may have various video and input/output interfaces 118 as well as one or more communications interfaces 120. The interfaces 118 can be used to couple the content server 104 to various peripherals, such as a display 122 (e.g., a CRT display, an LCD display, a plasma display, etc.), a keyboard 124, and a user input device 126. The communications interfaces 120 can be comprised of, for example, a modem, a network interface card, and/or a wireless network interface card. The communications interfaces 130 can enable the content server 104 to transmit and receive network-based content via an external network, such as the Internet, a wide area network (WAN), a local area network (LAN), direct data link, or similar wired (e.g., Ethernet) or wireless system (e.g., 802.11-compliant protocols), as discussed above.

Figure 5:
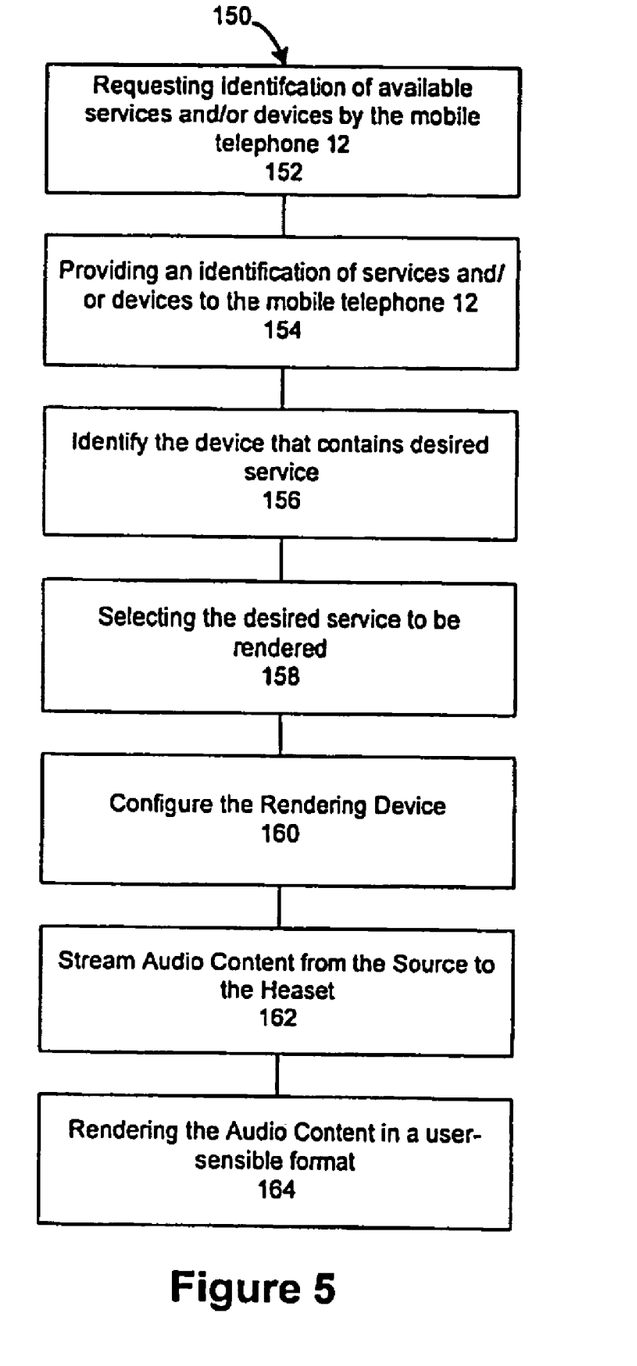
FIG. 5 is an exemplary flow chart in accordance with aspects of the present invention.

Referring to FIG. 5, a method 150 in accordance with one aspect of the present invention is illustrated. Method 150 assumes that an application on the content server 104 (e.g., content server 104A and/or content server 104B) has knowledge not only of the content available but also of the possible devices available to render the content. An exemplary use case is when a mobile telephone user desires to listen to content stored on the content server 104 using wireless headset 14. Preferably, the wireless headset 14 is a stereo headset. The method 150 assumes that all devices (e.g., mobile telephone 12, headset 14 and network 100) are associated properly with their respective connections and/or networks.

At step 152, via the mobile telephone 12, the user browses services available on the content server 104. At step 154, the identification of available services and/or devices is provided to the mobile telephone 12 through the access point 108 via WLAN interface adapter 52. At step 156, the user identifies the content server 104 (e.g., a media server) that contains multimedia content that the user desires to listen to and/or otherwise render. At step 158, the user selects the desired audio rendering device (e.g., the stereo headset 14 and/or mobile telephone 12).

At step 160, the rendering device is configured. The configuration of the rendering device by the mobile telephone 12 can take any form. For example, the configuration may occur through WLAN interface adapters 52 and 60, respectively; through local interface adapters 50 and 58, respectively, or by manually configuring the mobile telephone 12 and/or the headset 14. Preferably, an application in the mobile telephone 12 communicates with the headset 14 via Bluetooth to allow the user to conveniently control one of more operations of the headset 14.

At step 162, the selected audio content is streamed from the selected content server 104 to the headset 14 through the access point 108 to the WLAN interface adapter 60. This streaming step is generally initiated using the real-time media protocols that are specified by IETF standards (i.e., SIP, SDP, RTP, UDP and the like). In one embodiment, the headset 14 may request the content server 104 to initiate the streaming session using a universal resource locator (URL) link sent by the mobile telephone 12 via the Bluetooth protocol. In another embodiment, the content server 104 establishes the session to the headset 14 based on information exchanged with the mobile telephone 12 or stored in a device registry.

At step 164, the audio content is output and/or otherwise rendered through the speakers 24 in a user-sensible format. The audio playback of the streamed audio content is controlled by the mobile telephone via the local interface adapters 50, 58 (e.g., the Bluetooth interface). Such playback controls any desired operation including, for example, pause, rewind, fast forward, skip, stop, etc.

With respect to method 150, in a preferred embodiment, the mobile telephone 12 and the headset 14 associate directly with the access point 108. The mobile telephone 12 and the headset 14 do not typically associate directly with each other for WLAN communication, (i.e., infrastructure mode). In this manner, the mobile telephone 12 can continue to communicate with the WLAN 100 for other applications (e.g., to transmit and receive telephone calls, to receive voice over IP (VoIP), to access E-mail applications, to browse the Internet, to send and receive instant messages, etc.)

In another embodiment, the mobile telephone 12 and the headset 14 communicate directly via WLAN in an "ad hoc" mode. Communication in an ad hoc mode will generally require each device to periodically re-associate with the access point 110 to receive information and/data from one more associated devices in the network 100.

In practice, there may be situations where the system and method described above is impractical. For example, when the mobile telephone 12 and/or headset 14 may not be able to locate a network; may not be able to associate properly with an available network; and/or either the mobile telephone 12 or the headset 14 may not be able to access desired media services after network association. In these instances, one aspect of the invention includes a second communication mode, wherein the local interface adapters 50 and 58 are used to establish a Bluetooth link for both control and for media streaming of content stored locally on the mobile telephone 12.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time. Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

What is claimed is:

1. A method for rendering multimedia content stored on a network, the method comprising:
   obtaining a first unique address for a mobile telephone in a wireless local area network, wherein the local area network includes one or more associated devices;
   obtaining a second unique address for a rendering device in the local area network, wherein the rendering device is communicatively coupled to the local area network through a first interface to receive multimedia content and the rendering device is also communicatively coupled to the mobile telephone through a second interface to receive control information from the mobile telephone;
   requesting information from at least one of the associated devices on the local area network through the mobile telephone;
   receiving information responsive to the request for information by the mobile telephone, wherein the information includes available multimedia content;
   selecting multimedia content to be rendered based on the received information;
   selecting the rendering device to render the selected multimedia content;
   receiving the selected multimedia content at the rendering device through the first interface adapter; and
   rendering the selected multimedia content on the selected rendering device.

2. The method of claim 1, wherein at least one of the first unique address or the second unique address is an Internet Protocol address.

3. The method of claim 1, wherein the information includes an identification of services and/or devices available on the local area network.

4. The method of claim 3, wherein the identification of services includes multimedia content stored on a content server.

5. The method of claim 4, wherein the multimedia content includes at least one audible component.

6. The method of claim 5, wherein the multimedia content also includes a video component for display on the mobile telephone.

7. The method of claim 1, wherein the rendering device is communicatively coupled to the local area network through a wireless communication protocol.

8. The method of claim 7 further including transmitting control signals directly from the mobile telephone to the rendering device through a second wireless communication protocol.

9. The method of claim 8, wherein the control signals include a configuration from the rendering device based at least in part on the selected information to be rendered.

10. The method of claim 8, wherein the second wireless communication protocol is a Bluetooth compatible protocol.

11. The method of claim 1 further including the rendering device requesting one or more associated devices on the local area network to initiate a session using a universal resource locator link.

12. The method of claim 1, wherein at least one of the mobile telephone and/or the rendering device is authenticated by one or more devices on the local area network prior to receiving information responsive to the request for information.

13. The method of claim 1, wherein the rendering device is a headset.

14. A method for rendering multimedia content stored on a network, the method comprising:
  determining presence of a local area network by a mobile telephone having a network adapter, wherein the local area network includes one or more associated devices;
  configuring a rendering device to operate in a first communication mode when the local area network is present and configuring the rendering device to operate in a second communication mode when the local area network is not detected, wherein the mobile telephone provides control information to the rendering device in the first communication mode and the second communication mode; and
  wherein in the first communication mode, the rendering device is configured to render multimedia content provided directly from an access point associated with the local area network through a wireless adapter that communicates with the local area network through an 802.11-compatible protocol.

15. The method of claim 14, wherein the rendering device is configured to render the multimedia content provided from the mobile telephone in the second communication mode.

16. The method of claim 15, wherein the multimedia content is provided to the rendering device through a second wireless adapter.

17. The method of claim 16, wherein the wireless adapter is a Bluetooth adapter.

18. The method of claim 14 further including configuring the rendering device in the first and second communication mode by the mobile telephone prior to rendering an associated multimedia content.

19. A method for rendering multimedia content stored on a network, the method comprising:
  obtaining a unique address for a rendering device in a local area network, wherein the rendering device is communicatively coupled to the local area network through a first interface to receive multimedia content and the rendering device is also communicatively coupled to a mobile telephone to receive control information from the mobile telephone through a second interface;
  requesting information from at least one of the associated devices on the local area network through the mobile telephone;
  receiving information responsive to the request for information by the mobile telephone at the rendering device through the first interface, wherein the information includes available multimedia content; and
  rendering the multimedia content received directly from the local area network on the rendering device.

* * * * *